Feb. 17, 1925.　　　　　　　　　　　　　　　　　　　1,526,524
W. A. BROWN ET AL
HEATING, COOLING, AND LIGHTING FIXTURE
Filed Nov. 27, 1923　　　6 Sheets-Sheet 1

ON LINE 4-4
OF FIG.2.

INVENTORS
William A. Brown,
Elbert A. Corbin Jr.
BY
Niedersheim Fairbanks
ATTORNEYS.

Feb. 17, 1925.
W. A. BROWN ET AL
1,526,524
HEATING, COOLING, AND LIGHTING FIXTURE
Filed Nov. 27, 1923     6 Sheets-Sheet 2
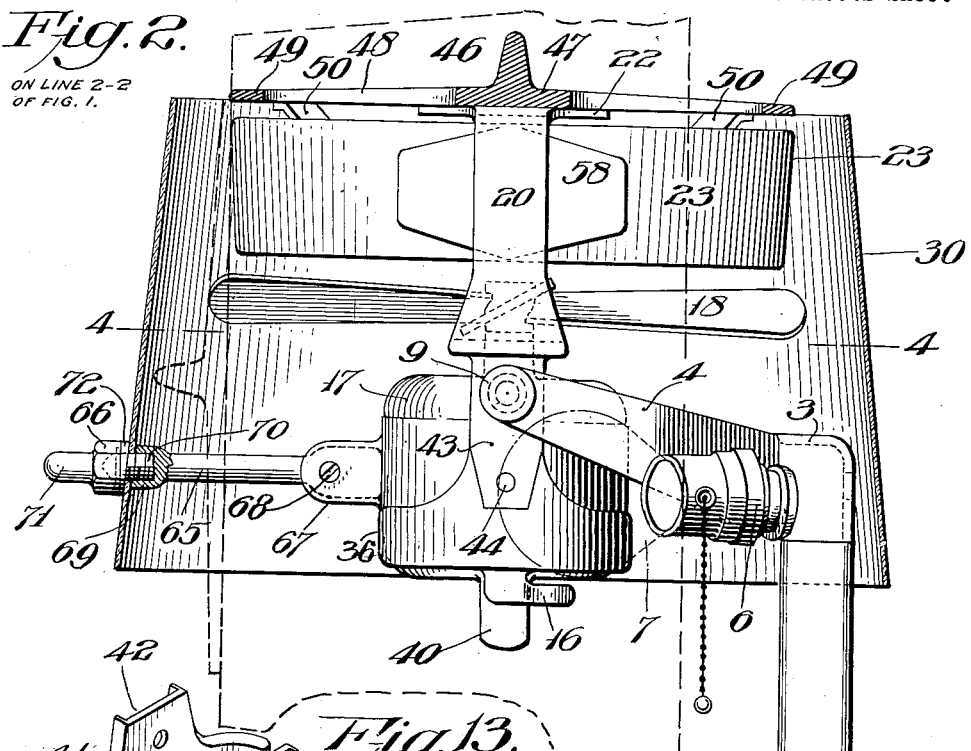
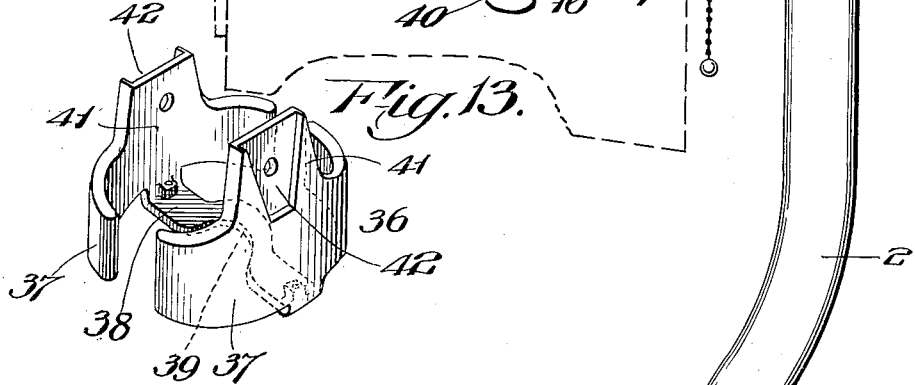
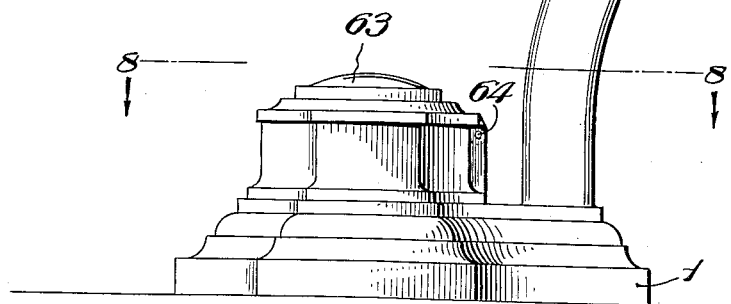

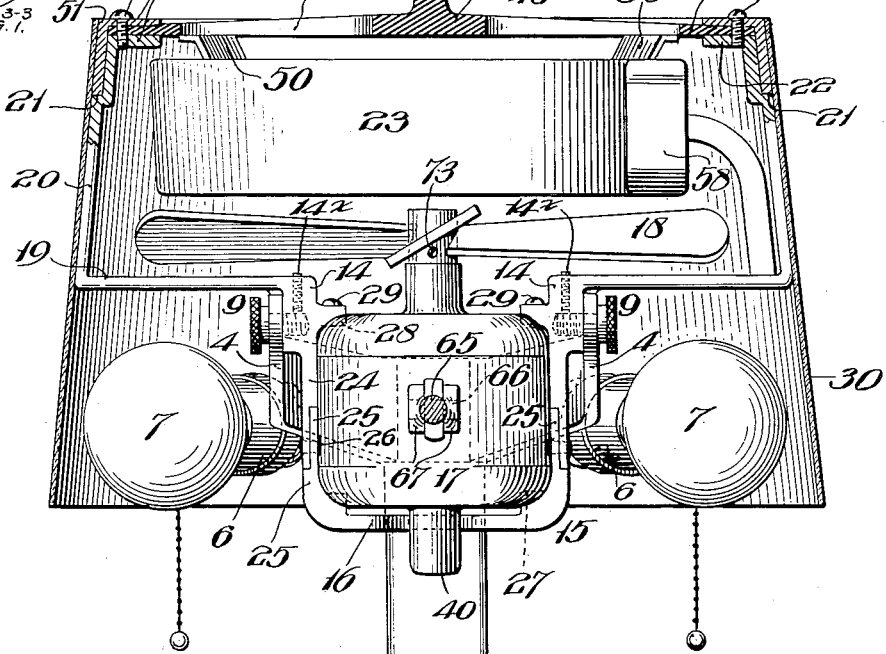
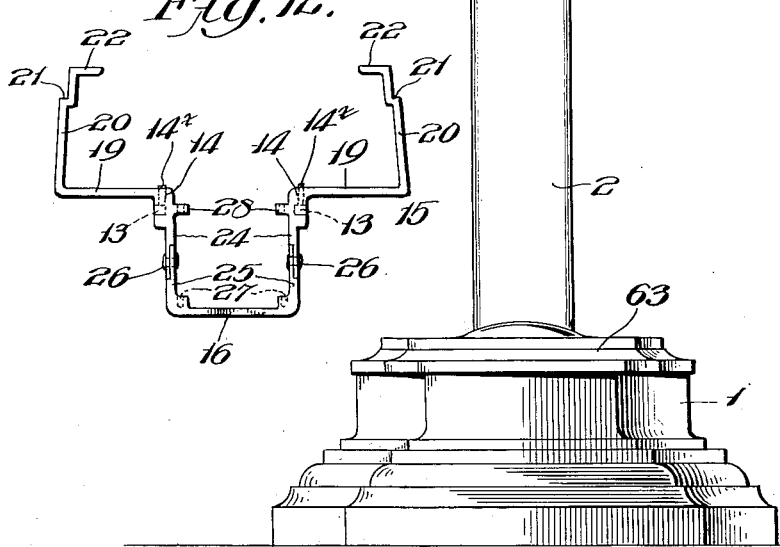

Feb. 17, 1925.
W. A. BROWN ET AL
1,526,524
HEATING, COOLING, AND LIGHTING FIXTURE
Filed Nov. 27, 1923
6 Sheets-Sheet 4
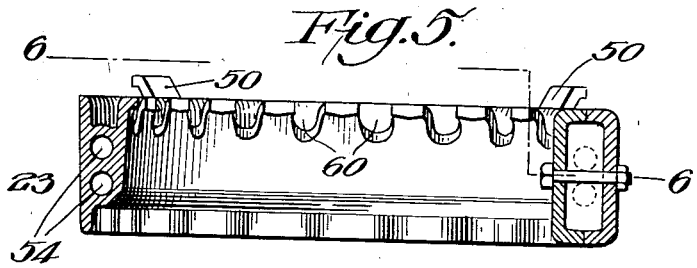
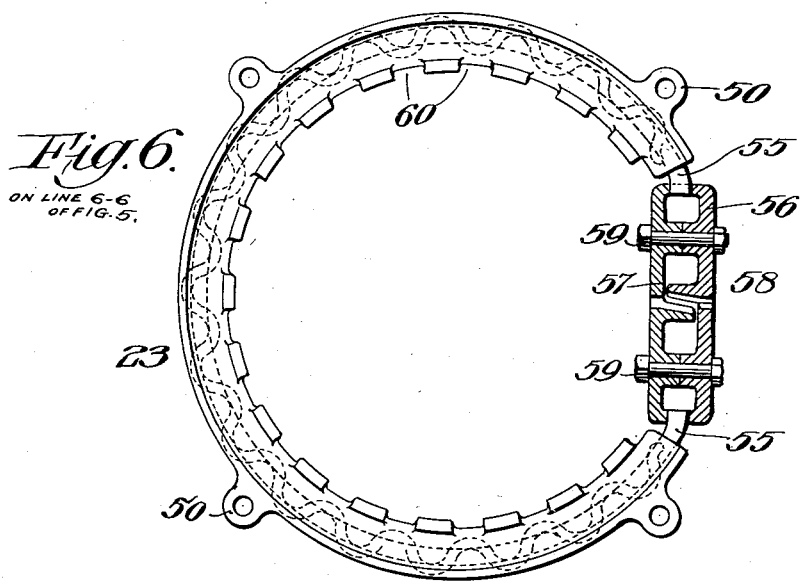
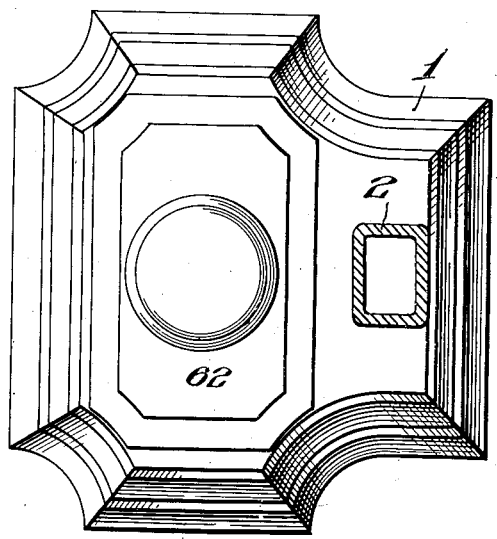
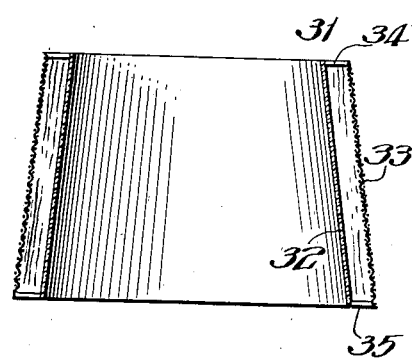

Feb. 17. 1925.  1,526,524
W. A. BROWN ET AL
HEATING, COOLING, AND LIGHTING FIXTURE
Filed Nov. 27, 1923   6 Sheets-Sheet 5
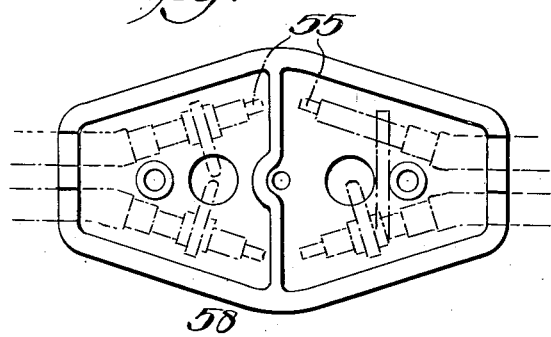
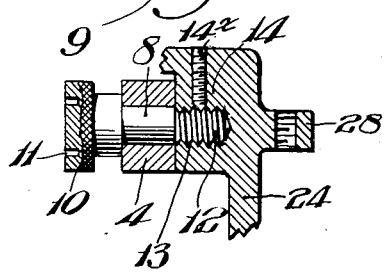
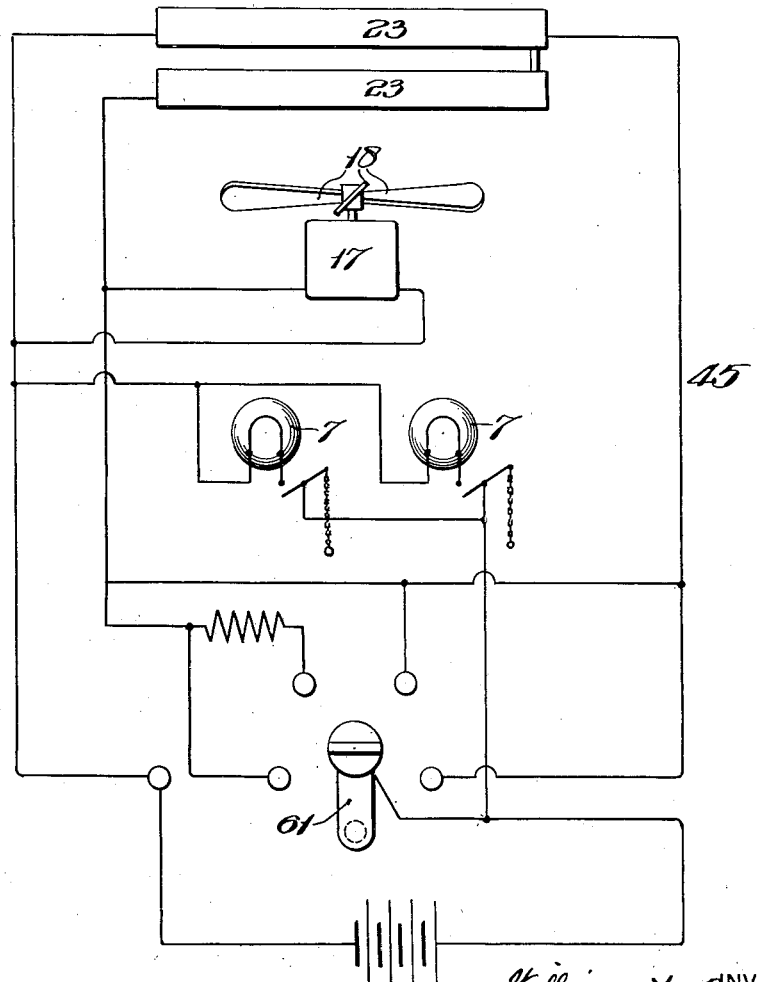

Feb. 17, 1925.
W. A. BROWN ET AL
1,526,524
HEATING, COOLING, AND LIGHTING FIXTURE
Filed Nov. 27, 1923
6 Sheets-Sheet 6
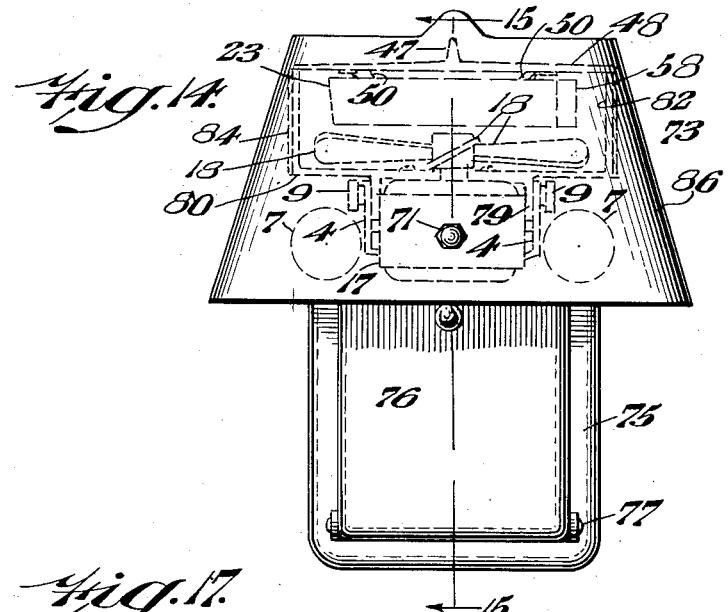
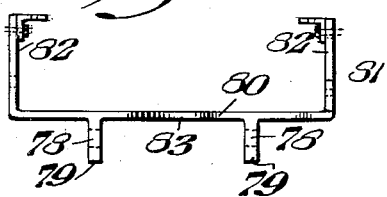
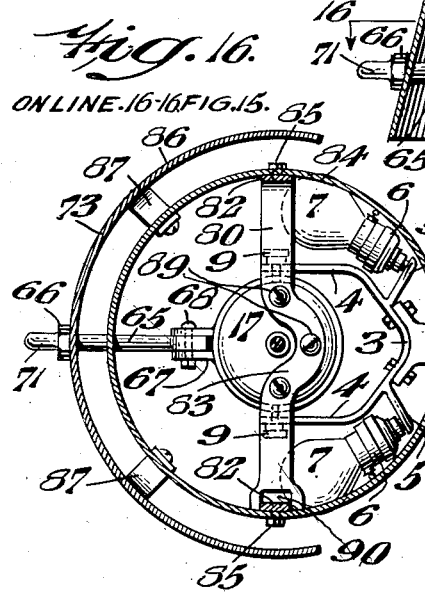
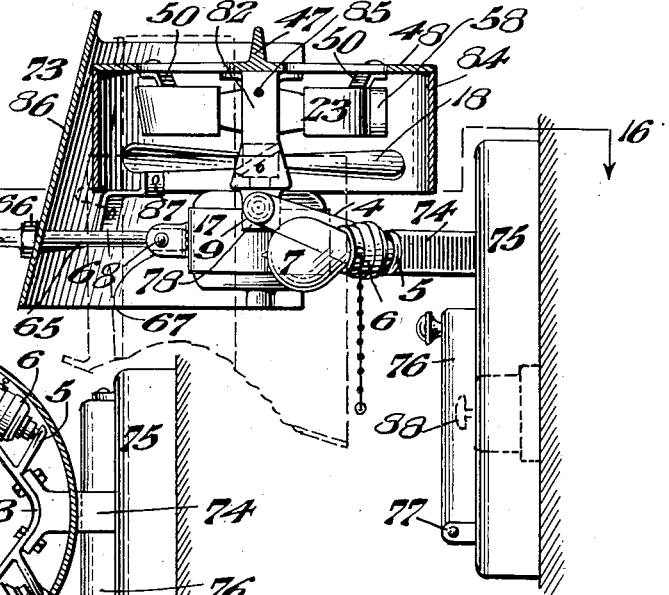
INVENTORS
William A. Brown
Elbur A. Corbin, Jr.
BY
ATTORNEYS.

Patented Feb. 17, 1925.

1,526,524

UNITED STATES PATENT OFFICE.

WILLIAM ALLEN BROWN, OF PHILADELPHIA, AND ELBERT A. CORBIN, JR., OF SWARTHMORE, PENNSYLVANIA.

HEATING, COOLING, AND LIGHTING FIXTURE.

Application filed November 27, 1923. Serial No. 677,234.

*To all whom it may concern:*

Be it known that we, WILLIAM ALLEN BROWN, a citizen of the United States, residing in Philadelphia, county of Philadelphia, State of Pennsylvania, and ELBERT A. CORBIN, Jr., a citizen of the United States, residing in Swarthmore, county of Delaware, State of Pennsylvania, have invented a new and useful Heating, Cooling, and Lighting Fixture, of which the following is a specification.

Our invention consists of a novel construction of a combined heating, cooling, and lighting fixture, wherein the cooling and heating elements are pivotally mounted in a novel manner upon a suitable support, so that said cooling and heating elements, together with the outer grid and the outer enclosing shade can be rotated or rocked as a unit in the desired direction.

Our present invention relates more particularly to a novel frame or cradle and its adjuncts, whereby the blower can be readily sustained from its pivotal supports, provision being made for weighting or counterbalancing the motor if desired and for securing the movable unit in the desired adjusted positions by frictional means.

Our invention further consists of a novel construction of supporting frame having means, whereby stationary electric lights are properly positioned with respect to the other novel elements of the apparatus, said frame having pivotally connected thereto, supporting arms and a cradle for the motor casing of the blower, which may be weighted, if desired, whereby the blowing apparatus and its adjuncts are conveniently assembled and supported in a novel manner.

It further consists of a novel construction of a weighted cradle adapted to be applied to the under side of the motor casing of the blower and novel means for assembling said weighted cradle with respect to the supporting arms which carry the shade and the outer grid, which latter supports the heating element.

It further consists of other novel features of advantage and construction, all as will hereinafter be fully set forth.

For the purpose of illustrating our invention, we have shown in the accompanying drawings forms thereof which are at present preferred by us, since in practice they will give satisfactory and reliable results, although it is to be understood that the various devices which our invention embodies may be variously arranged and organized and that our invention is not therefore limited to the precise arrangement and organization of the devices shown and described.

Figure 2 represents, a section on line 2—2, Figure 1.

Figure 3 represents, a section on line 3—3, Figure 1, but showing a slightly differently constructed supporting frame and cradle for the motor casing.

Figure 5 represents, a vertical sectional view of the casing of the heating element.

Figure 6 represents, a section on line 6—6, Figure 5.

Figure 7 represents, a vertical sectional view of a double shade which may be employed.

Figure 8 represents, a horizontal section on line 8—8, Figure 5.

Figure 9 represents, a front elevation of the junction box of the heating element, seen in Figures 5 and 6.

Figure 10 represents, a sectional view through one of the pivot screws, which supports the blower and its adjuncts.

Figure 11 represents, a form of wiring diagram, which may be employed.

Figure 12 represents, a side elevation of the supporting arm and cradle seen in Figure 3.

Figure 13 represents, a perspective view of the weighted cradle seen in Figure 2 in detached position.

Figure 14 represents, the front elevation of another embodiment of our invention, wherein a front curved plate is employed in lieu of an annular shade.

Figure 15 represents a vertical section on line 15—15, Figure 14.

Figure 16 represents a horizontal section on line 16—16, Figure 15.

Figure 17 represents a front elevation of a bracket employed, shown in detached position.

Figure 1:
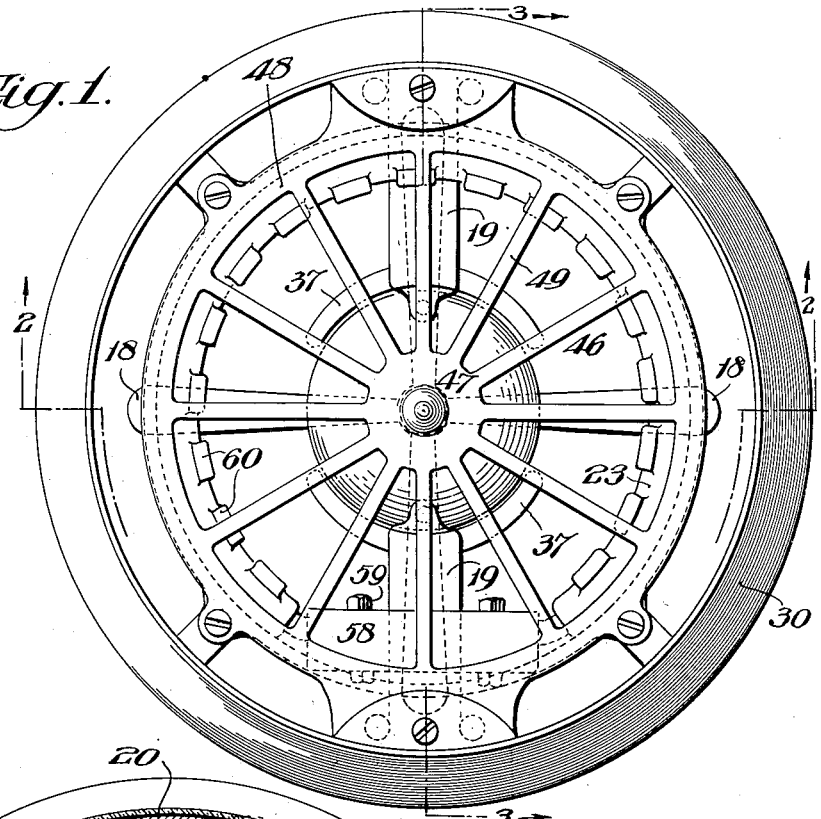
Figure 1 represents, a plan view of a combined heating cooling and lighting fixture, embodying our invention.

1 designates the base of our novel device from which extends the hollow standard 2, to the top of which is bolted or otherwise secured the frame 3, having the parallel arms 4 and the outwardly projecting or diverging arms 5, which latter serve as supports for the sockets 6 of the laterally extending stationary electric bulbs or lamps 7, the latter being collocated so that standard sized electric bulbs may be employed, which are positioned so that they are clear of the movable elements of our device as will be hereafter explained. The arms 4 preferably incline upwardly as seen in Figure 2, and through their outer ends pass the unthreaded portions 8 of the pivot screws 9, having the heads 10, which may be provided with the spanner holes 11 (see Figure 10). The inner end of each screw 9 is threaded as at 12 and screwed in the threaded seat 13 of the upper member 14 of the frame 15, whose construction will be best understood from Figure 12. The set screw 14$^x$ are adapted to be screwed down upon the threads 12 to lock the parts in position, as will be explained. The frame 15 may be in one piece or as shown in Figures 3 and 12 it may be made in three pieces, the lower member 16, serving as a cradle to support the motor casing 17 of the fan or blower element 18. The upper frame members 14, have the vertical arms 24 and the laterally extending arms 19, and the upwardly extending converging arms 20, which have the upper outer shoulders 21 and the inwardly deflected terminals 22 which latter support the electric heating element 23 to be hereafter referred to. The juxtaposed surfaces of the pendant members 24 and the upwardly extending arms 25 of the cradle member 16, are rabetted and secured together as indicated at 26, and said arms 25 are provided with the bottom lugs 27 for supporting the motor casing 17, and the arms 24 are provided with the inwardly extending lugs 28, through which the screws 29 pass for securing the frame to the upper portion of the motor casing 17. By our novel construction of frame 15, a rigid support is provided for the motor casing or blower element as well as the heating element and in addition the shade 30 is effectively supported on the upwardly extending arms 20, as is evident. The shade 30 may be a single member seen in Figures 2, 3 and 4, or a double shade as seen at 31 in Figure 7, and composed of the inner and outer members 32 and 33. The shade 30 may be composed of mica, glass or other opaque or translucent fire proof material. The inner shade 32 may be composed of the same materials and the outer of silk or other fabric, oiled paper, parchment or the like. The shade members 32 and 33, are connected by the upper and lower brackets 34 and 35 or other equivalent fastening means. In Figures 3 and 12 we have shown one form of frame 15 for supporting the motor casing 17 and its adjuncts, while in Figures 2 and 13 we have shown another form of cradle 36, which comprises the two curved vertical thickened or weighted members, 37, joined by the bottom transverse bar 38 having the offset recess 39 to accommodate the hub 40 of the motor casing 17. The outer upper faces of the members 37 are elongated to form arms 41 in which are the tapering seats for the reception of the lower ends of the vertical arms 43 (see Figure 2). The upper ends of the vertical arms 43 carry the shade supporting arms 20, which are of the same construction and contour as the corresponding arms seen in Figure 3. The lower ends of the arms 43 are secured in their seats 41 by suitable fastening devices 44. Either of the frame and cradle constructions 15 seen in Figures 3 and 12 or 36 seen in Figures 2 and 13 may be employed, but when it is desired to weight the blower and its adjuncts, so as to minimize or absorb the vibrations thereof, we preferably employ the construction seen in Figures 2 and 13. The pivotal connections for supporting the blower member in both Figures 2 and 3 are the same and are as shown in Figure 10. The heating element 23 may comprise a single electric heater or a plurality of such heating elements, as will be understood from the wiring diagram 45, seen in Figure 11, and while the heater may be supported in various ways, we preferably employ the construction seen in Figures 1 and 3, wherein 46 designates the outer grid member, composed of the central portion 47, the outer ring portion 48 and the radial arms 49. 50 designates brackets having their lower ends secured to the casing of the heater and their upper ends secured to the rim 48 of the grid. The outer periphery of the ring 48 of the grid rests upon the inwardly deflected terminals 22 (see Figures 3 and 12), and is secured in position by the angles 51, the lower ends of said angles abutting on the shoulders 21, while the upper deflected portions 52 of the angles overlap the ring member 48 of the grid, and the parts are firmly held in assembled position by the screws 53, which are threaded into the terminals 22, as will be understood from Figure 3. It will thus be seen from the foregoing that the frame or cradle member as 15 which carries the blower and its adjuncts is pivotally supported from the stationary arms 4. The arms 20 of the frame support the shade. The upper terminals of the arms 20, support the grid 46, and from the grid 46, is supported the heater 23 by means of the brackets 50. The blower, heater, shade and grid can consequently be actuated or rotated as a unit in the desired direction, so as to diffuse the heat in the direction desired, and the parts can be temporarily locked in the desired position by tightening the screws 9 seen in Figure 10, and then tightening the set screws 14$^x$. It will be apparent that notwithstanding we use standard or large sized electric bulbs 7, the latter are so positioned that they are clear of all the movable elements of our device. The heater element may be variously constructed, and in Figures 5, 6 and 9. we have shown one form, which may be employed. The heater casing or body 23 has two chambers or channels 54 therein, in which are contained the electrically heated elements 55, whose ends enter the junction box members 56 and 57 of the junction box 58, which are held together by the bolts 59. The upper wall of the heater casing 23, has the inwardly and downwardly extending air deflectors 60, as seen in Figure 5. The wiring common to the blower, heater and lights can be connected up in any conventional manner, as will be evident to those skilled in the art and may be in accordance with the wiring diagram seen in Figure 11 and the operation of the various elements may be controlled in the same manner as in our contemporaneously pending application, Serial No. 659404, filed August 25, 1923. The switch 61 seen in the wiring diagram 45, can be located in the chamber 62, in the base 1, and is readily accessible upon lifting the lid 63 which is hinged at 64 to the base 1. The unit composed of the blower, heater, grid and shade may be rocked or rotated by any convenient means, and in Figures 2 and 3 we have shown a handle 65, having a nut 66 thereon, the inner end of the handle being secured by the pin 68 to the ears 67.

We preferably construct the handle member as seen at the left of Figure 2, the portion thereof abutting against the inner surface of the shade being provided with the shoulder 69 and threaded internally so as to receive the threaded stem 70 of the outer member 71. The nut 66 is preferably screwed down on to the beveled washer 72, so that when the parts are assembled, the lower portion of the shade is held between the shoulder 69 and the washer 72 so that the shade will not be crushed or bent when the handle member 71 is grasped in the act of tilting the shade, grid, heater and blower as a unit in the desired direction. It is important in devices of this character that provision be made for enabling the blower and its adjuncts to be readily assembled or dismantled, and our construction of yoke or cradle seen in Figures 12 and 13 enables this to be readily done. The motor of the fan is very readily accessible, since it is only necessary in the construction seen in Figure 12 to remove the screws or fastenings 26, and upon the removal of the lower screws at the points 27 from the cover at the lower side of the motor casing 17, the yoke can be readily removed as well as the motor casing. Upon removing the small set screw 73 which holds the fan blades 18 on the shaft of the motor, the motor can then be withdrawn without disturbing any of the main feed wires of either the fan, lights, or heating unit. To disassemble the construction seen in Figures 2 and 13, substantially the same procedure is had, the fastening devices 44 being first removed, then the fastening devices for the lower portion of the motor casing, after which the fan blades 18 can be readily withdrawn. This feature of the accessibility of the blower mechanism and its adjuncts is one of great importance in devices of this character and as this construction of sectional frame or cradle is broadly new, our claims to these features are to be interpreted in the scope accorded to inventions of this character. The operation is as follows: In the embodiments seen in Figures 2 and 3, the device is shown as designed for a table or boudoir lamp, although it is obvious that by elongating the standard 2 the device is equally applicable for a floor lamp. In moderate weather, as in spring or fall the device can be utilized if desired solely as a lamp, the electric lights only being employed. In hot weather the fan or blower element can be utilized at a high or low speed either alone or in conjunction with the lights, as is evident. In cold weather when it is desired to use the heating element 23, it will be apparent that if desired, either a single heating element may be employed, or a plurality of such heating elements, as seen in the wiring diagram 45. Further, if desired, either one or a plurality of such heating elements may be energized and one or more thereof may be used either independently or simultaneously either with or without the blower by the proper manipulation of the switch 61 or a closing of the desired electric circuits.

It will thus be seen that our novel device is adapted to various uses, since it is not only ornamental in appearance but also provides lighting, heating and cooling means, which are instantly capable of use simultaneously or independently under all climatic conditions, which may prevail in any country or latitude. The electric lights 7 are fixedly secured in position with respect to the standard 2 and the other movable devices, as there is no necessity for rocking or tilting them. The blower or fan member and its adjuncts as well as the heater, grid and shade are adapted to be readily turned or tilted into any angle from the vertical to the horizontal plane, or into any intermediate positions, when it is desired to diffuse the current of heated or cooled air in any particular direction and the blowing and heating elements can be temporarily held in their extreme or intermediate positions, as may be desired by the tightening of the mechanisms seen in Figure 10. It is obvious that our device will function perfectly with either of the cradle constructions seen in Figure 12 or Figure 13, but in case it is desired to weight the blower, so as to minimize and absorb the vibrations thereof, we preferably employ the construction seen in Figures 2 and 13, it being apparent that the weighted members 37 connected by the bottom transverse bar 38 will function perfectly to absorb the vibrations of the motor and blower, so that the latter will function noiselessly and silently. The outer grid 46 not only enhances the external appearance of the device but also serves as an effective supporting means for the heater element. Either the single shade 30 or the double shade 31 seen in Figure 7 may be employed and said shade effectively serves to conceal the lighting, blowing and heating elements which are grouped within a very small compass, as is evident.

We have deemed it unnecessary to describe in detail the precise manner of wiring for the electrically operated elements, as this will be apparent to any one skilled in the art, or to describe in detail the precise manner of connecting the terminals of the electric heating elements, seen in Figures 6 and 9, as this can be effected in various ways, as described in our contemporaneously pending patent application aforesaid, it being only essential that the energizing of the plurality of the heating elements seen in the wiring diagram in Figure 11 be effected either independently or simultaneously according to the amount of heat required. It will be evident in lieu of one or two heating elements, 3, 4, 5, or 6 may be used, if found necessary or desirable, and it is also obvious that any standard type of heating element may be used, which may be mounted with or without the casing 23 if desired. It will also be apparent that any conventional form of motor or blowing or cooling apparatus can be employed, the cradle structure seen in Figures 12 and 13 being designed to accommodate the motor casing of any suitable standard or convention motor now on the market.

Figure 4:
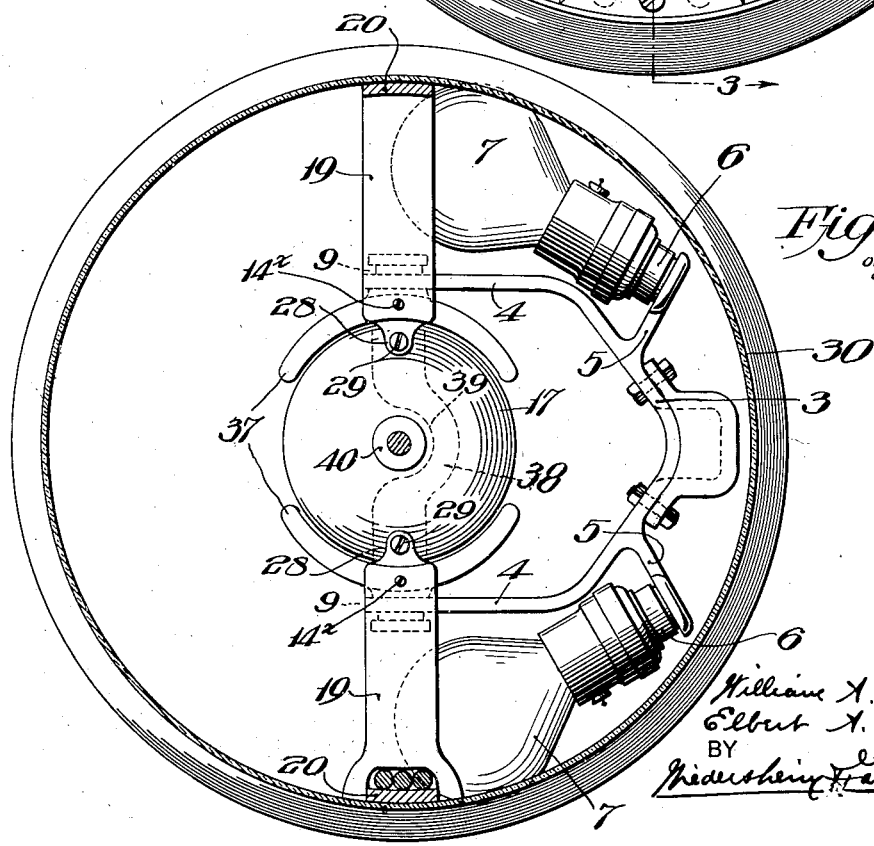
Figure 4 represents, a transverse section on line 4—4, Figure 2.

In the construction seen in Figures 14 to 17 we have shown another embodiment of our invention wherein 73 designates a fixture, which is adapted to be mounted as a wall bracket or supported from a side wall, wherein a semiconical deflector is employed in lieu of the annular shade seen in Figures 1, 2, 3 and 4. In Figures 15 and 16, 74 designates a horizontal arm or laterally extending bracket which can be formed as an attachment to a closet or cabinet 75, which is provided with a door 76, which is hinged at 77, so as to drop downwardly. The bracket 74 is bolted or secured to the frame 3, already described with reference to Figure 4, said frame having the parallel arms 4, and offset arms 5 carrying the electric light sockets 6 and the bulbs or lamps 7, all as seen in Figures 4 or 16. The pivot screws 9 are of the same character as the screws seen in Figures 4 and 10 and pass through the ends of the arms 4 through the holes 78, (see Figure 17) in the pendant lugs 79 which are carried by or depend from the base 80 of the bracket 81, which is provided with the vertical arms 82, as will be understood from Figures 15 to 17. The motor casing 17 is of the same character as already described. The central portion of the base 80 is offset as indicated at 83, to permit the motor shaft to extend upwardly and carry the fan or blower element 18, above which is the electrically heated element 23 of the same character as already described, said heater element 23 being connected to the grid 48 by brackets 50, the same manner as already described in Figure 3 and to the grid member 48 is attached an annular pendant guard member 84, which surrounds the blower and heater. The annular guard member 84 is secured to the arms 82 by means of the screws 85 or the like. The outer semi-conical deflector 86 is supported with respect to the annular guard member 84 by the brackets 87. The rod and handle members 65 and 71 are assembled in substantially the same manner, as described with respect to Figure 2 and need not be described in greater detail. It will thus be seen that in the construction seen in Figures 15 to 17, the horizontal arm 74 and the stationary horizontal arms 4, the pivot screws 9 seen in Figures 14, 15 and 16 and the motor casing 17 are effectively held in assembled position with respect to the bracket 81. The grid 48 is supported upon the upper terminals of the arms 82, the guard 84 is supported from the arms 82, and the outer semi-conical shade member 86 is supported from the guard 84 by the brackets 87. The base member 80 is secured to the top of the motor casing 17 by the screws 89, so that the motor 17, bracket 81, the blowing and heating elements 18 and 23, the grid 48, guard 84 and shade 86, can be adjusted as a unit upon grasping the handle 71. The construction seen in Figures 14 to 17 provides a somewhat simpler manner of collocating the motor, blower and heater, grid, guard and outer shade element and it will be seen that by properly calculating the position of the fulcrum points of the pivot screws 9 with respect to the motor casing 17, the latter will serve as a counterbalancing element, so that the parts will readily assume the position seen in full lines in Figure 15, or the position seen in dotted lines in said figure, and all the elements will be properly counterbalanced in all the intermediate positions, the adjustable unit may assume.

We have found it desirable in some instances to employ the semi-conical shade member 86 in lieu of an annular shade and the shade member 86, such as seen in Figures 14 to 16, will function as effectively as an annular or conical shade heretofore described and its expense will obviously be about one half. It will be obvious that while we have shown the combined heating and blowing and guard element and their adjuncts seen in Figures 14 to 16 as supported from the side bracket or arm 74, attached to the wall, said arm may be supported upon a pedestal or stand supported on a table or floor or by any other desired means, as is evident. A switch 88 positioned as seen in Figure 15 may be employed for controlling the blowing and heating elements, but it is obvious that said switch may be positioned at some other point than that shown, and that either a single heating element may be employed in Figure 15 or a plurality of said heating elements, as desired. The shade 86 may be made of any suitable material as is evident, and all the parts seen in Figures 14 or 17 may be enamelled in any desirable color. The hole 90 seen in Figure 16 permits the passage of the wires to the heating and blowing elements.

It is evident that counterbalance weights, already described may be used on the devices shown in Figures 14 to 16, if desired.

Having thus described our invention, what we claim as new and useful to secure by Letters Patent, is:—

1. In a device of the character stated, a support, arms projecting therefrom, a frame pivotally mounted on said arms and comprising a lower cradle member and upwardly extending arms, a blower motor casing supported in said cradle member, means for securing said cradle member with respect to said motor casing, a grid supported from the arms of said cradle member, and an electric heater supported from said grid and positioned in proximity to the blower.

2. In a device of the character stated, a support, arms projecting therefrom, a frame pivotally mounted on said arms and comprising a lower cradle member and upwardly extending arms, a blower motor casing supported in said cradle member and secured thereto, a grid supported from the arms of said cradle member, an electric heater supported from said grid and positioned in proximity to the blower, and screws passing through said first mentioned arms and having a threaded portion engaging the upright arms of said cradle member.

3. In a device of the character stated, a support, arms projecting therefrom, a frame pivotally mounted on said arms and comprising a bottom cradle member and upwardly extending arms, a blower motor casing supported in said cradle member and secured thereto, a grid supported from the arms of said cradle member, an electric heater supported from said grid and positioned in proximity to the blower, pivot screws extending through said first mentioned arms and having a threaded portion engaging the arms of said cradle member, and set screws passing through said frame and engaging the threaded portion of said pivot screws.

4. In a device of the character stated, a support, arms projecting therefrom, a frame pivotally mounted on said arms and comprising a lower cradle member and upwardly extending arms, a blower motor casing supported in said cradle, a grid supported from the arms of said cradle member and an electric heater supported from said grid and positioned in proximity to the blower, in combination with a shade surrounding the heater and blower and supported upon upward extensions of said cradle arms.

5. In a device of the character stated, a support, arms projecting therefrom, a frame pivotally mounted on said arms and comprising a lower cradle member and upwardly extending arms, a blower motor casing supported in said cradle member and secured thereto, a grid supported from the arms of said cradle member, an electric heater supported from said grid and positioned in proximity to the blower, and screws passing through said first mentioned arms and having a threaded portion engaging the upright arms of said cradle member, in combination with a shade surrounding the heater and blower and supported upon upward extensions of said cradle arms.

6. In a device of the character stated, a support, arms projecting therefrom, a frame pivotally mounted on said arms and comprising a bottom cradle member and upwardly extending arms, a blower motor casing supported in said cradle member and secured thereto, a grid supported from the arms of said cradle member, an electric heater supported from said grid and positioned in proximity to the blower, pivot screws extending through said first mentioned arms and having a threaded portion engaging the arms of said cradle member, and set screws passing through said frame and engaging the threaded portion of said pivot screws, in combination with a shade surrounding the heater and blower and supported upon upward extensions of said cradle arms.

7. In a device of the character stated, a support, arms projecting therefrom, a frame pivotally mounted on said arms and comprising a lower cradle member and upwardly extending arms, a blower motor casing supported in said cradle member, means for securing said cradle member with respect to said motor casing, a grid supported from the arms of said cradle member, and an electric heater supported from said grid and positioned in proximity to the blower, in combination with laterally projecting lights carried by said support and a shade surrounding the heater, blower and lights and supported upon upward extensions of said cradle arms.

8. In a device of the character stated, a support, arms projecting therefrom, a frame pivotally mounted on said arms and comprising a lower cradle member and upwardly extending arms, a blower motor casing supported in said cradle member and secured thereto, a grid supported from the arms of said cradle member, an electric heater supported from said grid and positioned in proximity to the blower, and screws passing through said first mentioned arms and having a threaded portion engaging the upright arms of said cradle member, in combination with laterally projecting lights carried by said support and a shade surrounding the heater, blower and lights and supported upon upward extensions of said cradle arms.

9. In a device of the character stated, a support, arms projecting therefrom, a frame pivotally mounted on said arms and comprising a bottom cradle member and upwardly extending arms, a blower motor casing supported in said cradle member and secured thereto, a grid supported from the arms of said cradle member, an electric heater supported from said grid and positioned in proximity to the blower, pivot screws extending through said first mentioned arms and having a threaded portion engaging the arms of said cradle member, and set screws passing through said frame and engaging the threaded portion of said pivot screws, in combination with laterally projecting lights carried by said support and a shade surrounding the heater blower and lights and supported upon upward extensions of said cradle arms.

10. In a device of the character stated, a support, arms projecting therefrom, a frame pivotally mounted on said arms and comprising a plurality of members, the central lower members serving as a cradle and the upright portions of the latter having laterally projecting members terminating in extending arms provided with inwardly deflected terminals, a blower motor casing supported in said cradle member, a blower motor, fastening devices common to said cradle and motor, a grid supported on said upper terminals and an electric heater supported from said grid in proximity to said blower.

11. In a device of the character stated, a support, arms projecting therefrom, a frame pivotally mounted on said arms and comprising a cradle and detachable upwardly extending arms, a blower motor casing supported in said cradle and secured thereto, a grid supported from the arms of said cradle member, an electric heater supported from said grid and positioned in proximity to the blower, said grid, heater and blower being movable as a unit, and stationary electric lights projecting from said support on opposite sides thereof, out of the path of the movable elements.

12. In a device of the character stated, a support, arms projecting therefrom, a frame pivotally mounted on said arms and comprising a plurality of members, the central lower member serving as a cradle and the upright portions of the latter having laterally projecting members terminating in extending arms provided with inwardly deflected terminals, a blower motor casing supported in said cradle member, a blower motor, fastening devices common to said cradle and motor, a grid supported on said upper terminals and an electric heater supported from said grid in proximity to said blower.

13. In a device of the character stated, a standard, a laterally extending frame secured thereto, an electric blower casing, a sectional cradle within said frame in which said casing is supported, pivotal connections common to said cradle and the ends of said frame, means for tightening and loosening said pivotal connections, an electric heater, and arms common to said cradle and heater for supporting the latter.

14. In a device of the character stated, a standard, a laterally extending frame secured thereto, an electric blower casing, a sectional cradle within said frame in which said casing is supported, pivotal connections common to said cradle and the ends of said frame, means for tightening and loosening said pivotal connections, an electric heater, and arms common to said cradle and heater for supporting the latter, in combination with electric lights supported on the upper end of said standard and positioned below said frame and out of the path of said cradle, and its adjuncts.

15. In a device of the character stated, a standard, a laterally extending frame secured thereto, an electric blower casing, a sectional cradle within said frame in which said casing is supported, pivotal connections common to said cradle and the ends of said frame, means for tightening and loosening said pivotal connections, an electric heater, and arms common to said cradle and heater for supporting the latter, in combination with electric lights, supported on the upper end of said standard and positioned below said frame and out of the path of said cradle and a shade supported upon said arms, and concealing said lights, heater and casing.

16. In a device of the character stated, a standard, a laterally extending frame secured thereto, an electric blower casing, a cradle within said frame in which said casing is supported, pivotal connections common to said cradle and the ends of said frame, means for tightening and loosening said pivotal connections, an electric heater, and arms common to said cradle and heater for supporting the latter, in combination with a shade supported on said arms and concealing said casing and heater.

17. In a device of the character stated, a standard, a laterally extending semi-circular frame connected thereto, a sectional cradle within said frame, arms secured to opposite portions of said cradle, pivotal connections for the ends of said frame and in threaded engagement with said arms, a blower casing supported within said cradle, and a heater carried by said cradle arms.

18. In a device of the character stated, a standard, a laterally extending frame secured thereto, an electric blower casing, a sectional cradle within said frame in which said casing is supported, pivotal connections common to said cradle and the ends of said frame, means for tightening and loosening said pivotal connections, an electric heater, means common to said cradle and heater for suporting the latter, and weights on opposite portions of said cradle for counterbalancing the latter and its adjuncts.

19. In a device of the character stated, a standard, a laterally extending frame secured thereto, an electric blower casing, a cradle within said frame in which said casing is supported, pivotal connections common to said cradle and the ends of said frame, means for tightening and loosening said pivotal connections, an electric heater, means common to said cradle and heater for supporting the latter, and weights on opposite portions of said cradle for counterbalancing the latter and its adjuncts, in combination with electric lights supported on the upper end of said standard and positioned below said frame and out of the path of said casing, and its adjuncts.

20. In a device of the character stated, a standard, a laterally extending frame secured thereto, an electric blower casing, a cradle within said frame in which said casing is supported, pivotal connections common to said cradle and the ends of said frame, means for tightening and loosening said pivotal connections, an electric heater, arms common to said cradle and heater for supporting the latter, and weights on opposite portions of said cradle for counterbalancing the latter and its adjuncts, in combination with electric lights supported on the upper end of said standard and positioned below said frame and out of the path of said casing, and a shade supported upon said arms and concealing said lights, heater and casing.

21. In a device of the character stated, a standard, a laterally extending frame secured thereto, an electric blower casing, a cradle within said frame in which said casing is supported, pivotal connections common to said cradle and the ends of said frame, means for tightening and loosening said pivotal connections, an electric heater, arms common to said casing and heater for supporting the latter, and weights on opposite portions of said cradle for counterbalancing the latter and its adjuncts, in combination with a shade supported on said arms and concealing said casing and heater.

22. In a device of the character stated, a standard, a laterally extending semi-circular frame connected thereto, a cradle within said frame, arms secured to opposite portions of said cradle, pivotal connections for the ends of said frame and in threaded engagement with said cradle arms, a blower casing pivotally supported within said cradle arms on said cradle extending upwardly, a plurality of electrically heated elements carried by said arms, and weights on opposite portions of said cradle.

23. In a device of the character stated, a standard, a laterally extending semi-circular frame connected thereto, a cradle within said frame, arms secured to opposite portions of said cradle, pivotal connections for the ends of said frame and in threaded engagement with said arms, a blower casing pivotally supported within said cradle, a plurality of electrically heated elements carried by said arms, and weights on opposite portions of said cradle, in combination with electric lights supported from said standard and projecting laterally in proximity to said frame and ring.

24. In a device of the character stated, a standard, a laterally extending semi-circular frame connected thereto, a cradle within said frame, arms secured to opposite portions of said cradle, pivotal connections for the ends of said frame and in threaded engagement with said arms, a blower casing supported within said cradle, a plurality of electrically heated elements carried by said arms, and weights on opposite portions of said inner cradle, in combination with electric lights supported from said standard and projecting laterally in proximity to said frame and cradle, and a shade supported on said arms and enclosing said lights, blower and heating elements.

25. In a device of the character stated, a standard, a laterally extending semi-circular frame connected thereto, a cradle within said frame, arms secured to opposite portions of said cradle, pivotal connections for the ends of said frame and in threaded engagement with said cradle arms, a blower casing pivotally supported within said cradle, a plurality of electrically heated elements carried by said arms, and weights secured to opposite portions of said cradle, in combination with a shade supported on said arms and enclosing the blower and heater.

26. In a device of the character stated, a standard, a sectional cradle pivotally supported from said standard, a blower carried by said cradle, counterbalancing devices for said blower carried by said cradle and an electric heater supported in proximity to said blower.

27. In a device of the character stated, a standard, a cradle pivotally supported from said standard, a blower carried by said cradle, counterbalancing devices for said blower carried by said cradle and an electric heater supported in proximity to said blower, in combination with a shade surrounding said cradle, blower and heater.

28. In a device of the character stated, a standard, a cradle pivotally supported from said standard, a blower carried by said cradle, counterbalancing devices for said blower carried by said cradle and an electric heater supported in proximity to said blower, in combination with electric lights carried by said standard and projecting laterally therefrom, and a shade surrounding said blower, lights and heater, said blower, heater and shade being movable as a unit.

29. In a device of the character stated, a standard, a cradle pivotally supported from said standard, a blower carried by said cradle, counterbalancing devices for said blower carried by said cradle and an electric heater supported in proximity to said blower, said blower and heater being movable as a unit.

30. In a device of the character stated, a standard, a cradle pivotally supported from said standard, a blower carried by said cradle, counterbalancing devices for said blower carried by said cradle and an electric heater supported in proximity to said blower, in combination with a shade surrounding said blower and heater, and a handle on said shade for rotating said shade, blower and heater as a unit.

31. In a device of the character stated, a standard, a cradle pivotally supported from said standard, a blower carried by said cradle, counterbalancing devices for said blower carried by said cradle and an electric heater supported in proximity to said blower, in combination with electric lights supported from said standard, a shade adjacent to said lights, blower and heater, and means for rotating said blower and heater as a unit.

32. In a device of the character stated, a standard, a laterally extending frame secured thereto, an electric blower casing, a cradle within said frame in which said casing is supported, pivotal connections common to said cradle and the ends of said frame, means for tightening and loosening said pivotal connections, an electric heater, arms common to said blower casing and heater for supporting the latter, and a shade supported on said arms and concealing said casing and heater, said shade, blower casing and heater being movable as a unit.

33. In a device of the character stated, a standard, a laterally extending frame secured thereto, an electric blower casing, a sectional cradle within said frame in which said casing is supported, pivotal connections common to said cradle and the ends of said frame, means for tightening and loosening said pivotal connections, an electric heater, arms common to said casing and heater for supporting the latter, weights on opposite portions of said cradle for counterbalancing the latter and its adjuncts, a shade supported on said arms and concealing said weights, blower casing and heater, and means for rotating said shade, blower casing and heater as a unit.

34. In a device of the character stated, a standard, laterally extending electric lights supported from the upper portion thereof, a frame supported from said standard above said lights, a cradle pivotally supported in said frame, a blower supported in said cradle, and a heater supported on said blower, said lights being out of the path of said ring, blower and their adjuncts.

35. In a device of the character stated, a standard, laterally extending electric lights supported from the upper portion thereof, a frame supported from said standard above said lights, a cradle pivotally supported in said frame, a blower supported in said cradle and a heater supported on said blower, said lights being out of the path of said cradle, blower and their adjuncts, in combination with a shade surrounding said lights, frame, cradle, blower and heater.

36. In a device of the character stated, a standard, laterally extending electric lights supported from the upper portion thereof, a frame supported from said standard above said lights, a cradle pivotally supported in said frame, a blower supported in said cradle, and a heater supported above said blower, said lights being out of the path of said cradle, blower and their adjuncts, in combination with a shade surrounding said lights, frame cradle, blower and heater, said shade, blower and heater being movable as a unit.

37. In a device of the character stated, a standard, laterally extending stationary electric lights supported from the upper portion thereof, a frame supported from said standard above said lights, a cradle pivotally supported in said frame, a blower pivotally supported in said cradle and a heater supported above said blower, said lights being out of the path of said ring, blower and their adjuncts.

38. In a device of the character stated, a standard, laterally extending stationary electric lights supported from the upper portion thereof, a frame supported from said standard above said lights, a cradle pivotally supported in said frame, a blower pivotally supported in said cradle, a heater supported on said blower, said lights being out of the path of said cradle, blower and their adjuncts, and a shade surrounding said lights, frame, cradle blower and heater.

39. In a device of the character stated, a standard, laterally extending stationary electric lights supported from the upper portion thereof, a frame supported from said standard above said lights, a cradle pivotally supported in said frame, a blower supported in said cradle, a heater supported above said blower, said lights being out of the path of said cradle, blower and their adjuncts, and a shade surrounding said lights, frame, cradle, blower and heater and supported from said heater, said shade, blower and heater being movable as a unit.

40. In a device of the character stated, a standard, laterally extending stationary electric lights supported from the upper portion thereof, a frame supported from said standard above said lights, a sectional cradle pivotally supported in said frame, a blower pivotally supported in said cradle, a heater supported above said blower, said lights being out of the path of said cradle, blower and their adjuncts, in combination with means for rotating said cradle, blower and heater.

41. In a device of the character stated, a standard, laterally extending stationary electric lights supported from the upper portion thereof, a frame supported from said standard above said lights, a cradle pivotally supported in said frame, a blower pivotally supported in said cradle, a heater supported above said blower, said lights being out of the path of said cradle, blower and their adjuncts, and a shade adjacent to said lights, frame, cradle blower and heater, in combination with means for rotating said cradle, blower and heater and shade.

42. In a device of the character stated, a standard, laterally extending stationary electric lights supported from the upper portion thereof, a frame supported from said standard above said lights, a cradle pivotally supported in said frame, a blower supported in said cradle, a heater supported above said blower, said lights being out of the path of said cradle, blower and their adjuncts, and a shade adjacent to said lights, frame, cradle, blower and heater said cradle, blower and heater being movable as a unit, in combination with means for rotating said shade, blower and heater.

43. In a device of the character stated, a motor casing, arms in which said motor casing is pivotally supported, a bracket having a base member secured to said motor casing, arms extending upwardly from said base member, an annular guard member secured to said arms, a grid supported on said arms, an electric heater supported from said grid, a blower actuated by the motor in said motor casing, and a front shade member supported from said guard.

44. In a device of the character stated, a motor casing, arms in which said motor casing is pivotally supported, a bracket having a base member secured to the top of said motor casing, arms extending upwardly from said base member, an annular guard member secured to said arms, a grid supported on said arms, an electric heater supported from said grid, a blower actuated by the motor in said motor casing and a front semi-conical shade member supported from the front of said guard.

45. In a device of the character stated, a motor casing, a frame in which said motor casing is pivotally supported, a bracket having a base member provided with a central offset to accommodate the motor shaft and secured to the top of said motor casing, upright arms carried by said base member, an annular guard member secured to said upright arms, a grid supported on said arms, an electric heater supported from said grid, a blower actuated by the motor in said motor casing, a semi-annular front shade member supported from the front of said bracket and a handle passing through the shade member and secured to the motor casing, whereby the motor casing, blower, grid, guard, and shade can be adjusted upon their pivotal supports as a unit.

46. In a device of the character stated, a motor casing, a frame in which said motor casing is pivotally supported, a bracket having a base member provided with a central offset to accommodate the motor shaft and secured to the top of said motor casing, upright arms carried by said base member, an annular guard member secured to said upright arms, a grid supported on said arms, an electric heater supported from said grid, a blower actuated by the motor in said motor casing, a semi-annular front shade member supported from the front of said bracket and a handle passing through the shade member and secured to the motor casing, whereby the motor casing, blower, grid, guard, and shade can be adjusted upon their pivotal supports as a unit, in combination with a lateral arm carrying said frame, motor and its adjuncts and a cabinet to which said lateral arm is secured.

47. In a device of the character stated, a motor casing, a frame, in which said motor casing is pivotally supported, a bracket having a base member secured to the top of said motor casing, arms extending upwardly from said base member pendant lugs on said base member through which the pivotal supports for said motor casing pass, an annular guard member secured to said arms, a top grid also supported on said arms, an electric heater supported from said grid, a blower actuated by the motor in said motor casing, and a front curved shade member supported from the front of said guard.

48. In a device of the character stated, a motor casing, a frame, in which said motor casing is pivotally supported, a bracket having a base member secured to the top of said motor casing, arms extending upwardly from said base member pendant lugs on said base member through which the pivotal supports for said motor casing pass, an annular guard member secured to said arms, a top grid also supported on said arms, an electric heater supported from said grid, a blower actuated by the motor in said motor casing, and a front curved shade member supported from the front of said guard, the pivotal connections for said motor being such that the motor counterbalances the other members of the unit.

49. In a device of the character stated, a frame, a motor casing, pivotal supports for said motor casing mounted in said frame, and a combined guard, fan and electric heater supported above said motor, the pivotal supports being so positioned that the motor casing counterbalances the other elements carried thereby.

50. In a device of the character stated, a frame, a motor casing, pivotal supports for said motor casing mounted in said frame and a combined guard, fan, electric heater and front shade supported upon said motor casing above the latter, the pivotal supports being so positioned that the motor casing counterbalances the other elements carried thereby.

WILLIAM ALLEN BROWN.
ELBERT A. CORBIN, Jr.

Witnesses:
E. HAYWARD FAIRBANKS,
RUTH HIDDLESON.